Oct. 27, 1970 R. G. SPADEMAN Re. 26,972

SAFETY BINDING

Original Filed April 29, 1965 4 Sheets-Sheet 1

INVENTOR.
Richard G. Spademan
BY
Barnard, McGlynn & Reising
ATTORNEYS

SAFETY BINDING

Original Filed April 29, 1965 4 Sheets-Sheet 2

INVENTOR.
Richard G. Spademan
BY
Barnard, McGlynn & Lessing
ATTORNEYS

SAFETY BINDING

Original Filed April 29, 1965 4 Sheets-Sheet 3

INVENTOR.
Richard G. Spademan
BY
Barnard, McGlynn & Reising
ATTORNEYS

SAFETY BINDING

Original Filed April 29, 1965 4 Sheets-Sheet 4

INVENTOR.
Richard G. Spademan
BY
Barnard, McGlynn & Leising
ATTORNEYS

United States Patent Office

Re. 26,972
Reissued Oct. 27, 1970

26,972
SAFETY BINDING

Richard G. Spademan, 933 Addison Ave.,
Palo Alto, Calif. 94301

Original No. 3,271,040, dated Sept. 6, 1966, Ser. No. 451,881, Apr. 29, 1965. Application for reissue Aug. 12, 1968, Ser. No. 754,170.
Int. Cl. A63c *9/086*
U.S. Cl. 280—11.35 86 Claims

Matter enclosed in heavy brackets [ ] appears in the original patent but forms no part of this reissue specification; matter printed in italics indicates the additions made by reissue.

*ABSTRACT OF THE DISCLOSURE*

*A safety ski binding in which the various degrees of movement of the ski boot are resisted, without requiring the use of a toe fastening device, by means releasably engaging structure associated with the side portions of the ski boot, such engagement being made rearwardly of the point of application of heeel lifting force on the ski boot.*

This is a continuation-in-part of copending application Serial Number 316,875, filed in the United States Patent Office on October 17, 1963, and entitled "Safety Binding," and now abandoned.

This invention relates to a new and improved ski binding through which a skier's boot is releasably secured to a ski and more particularly to a safety binding which is intended to release the skier from the skis in such a way as to prevent or minimize injury due to a fall or the assumption of a position likely to cause injury to the skier were he otherwise to remain fixed to his skis.

Safety bindings or harnesses particularly adapted for use with downhill-type skis have long been known and have assumed many forms. At the present time a skier has many varieties from which to choose in selecting an automatic releasable or safety-type ski binding. It is common for safety bindings to engage and retain the ski boot to the ski through both heel and toe fittings. Such bindings are variously known as heel and/or toe release safety bindings, depending upon whether the binding is adapted to release either or both the heel or toe during an incipient fall condition.

It is desirable with safety bindings to provide an arrangement which will, under normal conditions, rigidly retain the skier's boots to the ski to permit essentially no relative movement between the ski boot and the ski and at the same time to permit the ski boot to be released from the ski under conditions when the skier is likely to be injured if he remains fixed to the skis.

It has heretofore been presumed necessary to provide ski bindings, safety or otherwise, which have engaged both the heel and toe of the ski boot to properly retain the boot upon the ski.

It is proposed to provide a highly unique ski binding which enables the ski boot to be secured to the ski solely through a mechanism adapted to co-operate with the sides of the ski boot, and rearwardly of the point of application of the heel lifting force on the ski boot, without the necessity of providing a toe fastening device. With such binding a great simplification and reduction in the number of parts is achieved with a consequent material reduction in the costs of an acceptable ski binding of the safety or releasable type.

The device here presented bases a radical departure from previously known types of ski bindings on the recognition that the relatively rigid sole construction of a downhill ski boot may be used as a means for contributing to the simplification of a safety ski binding. It is fundamental in downhill skiing that there be essentially no movement possible between the skier's boots and his skis. To this end, downhill ski boots are made of an extremely stiff construction intended to make relative bending between the lower leg and the foot of the skier virtually impossible. Such ski boot construction also includes the use of a stiff, usually steel, plate running essentially the length of the boot between the upper boot and the sole or embedded in the sole. In this way, virtually no flexing of the boot sole is possible.

Thus, for practical purposes, a downhill ski boot may be considered to be a substantially rigid member. Being rigid, it is only necessary to secure one portion of the boot to the ski, in which event the entire ski boot is similarly connected to the ski. It has further been recognized in downhill skiing that a toe connection or binding alone is unusable since it is imperative that the heel of the boot be held in tight engagement with the ski. It is the pressure exerted through the heel that enables the skis to be turned. For proper control it is also necessary that the skier keep his weight forward to maintain pressure on the front of the skis. This forward pressure also tends to lift the heel, which could not be properly resisted by a toe binding alone.

The device in which this invention is embodied comprises, generally, a safety binding which coacts with the sides of the ski boot and only at a point on each side rearwardly of the point of application of the heel lifting force. The requirement of a toe connection is eliminated entirely and the boot is properly releasably retained upon the ski during all normal ski conditions. Such mechanism includes a pair of clamping members movably secured to the ski at opposite sides and engageable with suitable receiving means on the sides of the ski boot sole. The clamping members may be pivotally or slidably mounted on the ski. A spring actuated release mechanism is secured to the ski, either rearwardly or forwardly of the mounting to automatically detach the boot from the ski under twisting or falling conditions which are likely to cause injury to the skier unless he is released from his ski.

Such a construction offers the ease and simplicity of a single binding and does not require the use of a toe connection to secure the boot to the ski. The number of parts is few, contributing greatly to the economic benefits of the ski binding mechanism. There is no sacrifice in the safety of the ski binding mechanism, the construction being such as to securely retain the boot on the ski during normal conditions of skiing and to automatically release the ski when necessary to avoid a twist or fall.

The details, as well as other objects and advantages of the present invention, will become more apparent from the following description and drawings in which.

Figure 1:
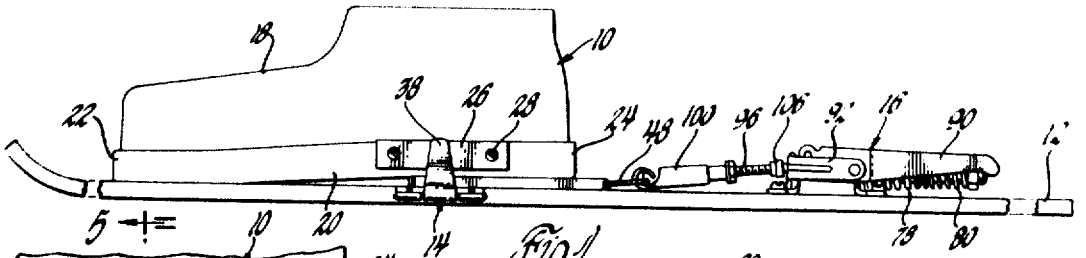
FIGURE 1 is a side view of a ski, ski boot, and ski binding assembly embodying one form of invention, illustrating the positions of the various parts.

Referring more particularly to the drawings, wherein like reference numerals indicate like parts throughout, FIGURES 1 through 5 illustrate one form of ski boot, ski, and binding assembly in which the invention is embodied. A ski boot, illustrated generally by the numeral 10, is to be secured to a ski 12 by means of a ski binding assembly, illustrated generally by the numeral 14. A spring biased release mechanism, illustrated generally by the numeral 16, is secured to the ski 12 and is connected to the binding or clamping means 14.

Ski boot 10 includes an upper portion 18 adapted to be worn and secured on the user's foot in the usual manner. A sole 20 is provided under the upper portion 18 and includes a toe portion 22 and a heel portion 24. A plate member 26 is secured to the sole 20 in some suitable manner as by screws 28, and one such plate is secured to each side of the sole 20. The position of the plate 26 along the length of the sole 20 is important, as will become hereinafter more apparent. Extending outwardly from the plate 26 is a protuberance or lug 30 which is shown in FIGURES 1 through 5 as being a flange member having a concave end 32 which engages the binding assembly 14.

Figure 5:
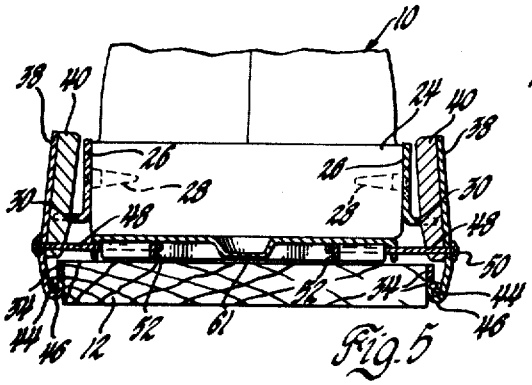
FIGURE 5 is a sectional view of the ski boot, ski binding, and ski assembly to illustrate the positions of the various parts in a clamped condition.

Secured to opposite sides of the ski 12 and adjacent the plates 26 is the ski binding or clamping means 14. As shown in the drawings, the clamping means include a plate 34 attached to the ski in any convenient manner as by screws 36. Pivotally secured to the plates 34 are clamping members 38 provided with lug engaging portions 40 complementary in shape to the lugs 30. In the embodiment shown in FIGURES 1 through 5, the lug engaging members constitute generally semi-cylindrical members secured to or integrally formed from the clamping arms 38 in any suitable manner. The members 40 coact with the semi-circular ends 32 of the lugs or protuberances 30. The clamping members 38 are pivotally secured to the plates 34 in any suitable manner, and, for illustration purposes, plates 34 are shown to include rolled portions 42, which receive and retain a pivot pin 44. Clamping members 38 may have rolled ends, as at 46, to receive and engage the pivot pins 44. Thus, the clamping arms 38 may pivot about the pins 44 toward and away from the ski boot 10 on the ski 12. Clamp arms 38 are so mounted as to be angularly inwardly disposed when in the clamping position. Attention is directed to FIGURE 5, which shows the relationship between the angled clamp members 38 and the lugs 30 on the ski boot sole 20. It is apparent that with such configuration and with the clamp arms 38 securely engaging the lugs 30, a tendency to move the heel portion 24 of the sole 20 upwardly relative to the ski 12 will increase the force applied by the clamp arms 38 on the lugs 30. This prevents the heel 24 of the ski boot 10 from raising off the ski 12 in an undesirable manner.

With the clamping members 38 in the clamping position and engaging the lugs 30 on the ski boot 10, it is seen that no movement of the boot relative to the ski is possible, except for safety release, as will become hereinafter more apparent. Otherwise, movement longitudinally of the ski is prevented, movement laterally of the ski is prevented, twisting relative to the ski is prevented, and heel lifting is prevented, as above noted. Thus, the boot 10 is properly secured to the ski during normal skiing operations.

In order to actuate the clamping arms 38 and to draw the clamping arms toward the ski boot 10, a cable or like means 48 is secured in any convenient manner to the clamp members 38. This may be by welding or brazing as at 50. Cable 48 extends inwardly from each of the clamp arms 38 and an arcuate rib 52 suitably mounted and positioned changes the direction of the cable to extend rearwardly, as viewed in the drawings. Cable 48 terminates in a loop 54 rearwardly of the heel position on the ski 12.

In order to protect the cable and to protect the skier's weight from making the cable inoperative, a plate member 56 is secured to the ski 12 in any suitable manner, as by screws 58. Plate 56 has downwardly depending edges 60 and a downwardly formed strengthening rib 61 formed therein to space the upper surface 56 from the ski 12 and provide a space underneath the plate 56 through which the cable 48 may pass unimpeded. Suitable slots 62 may be formed in the rearward end of the plate 56 so that the cable 48 may extend out from underneath the plate 56. Plate member 56 may also be conveniently formed to provide the ribs 52 for directing the cable 48.

The spring biased release means 16 are intended to engage the cable 48 and to actuate the clamping arms 38 for clamping the boot 10 on the ski 12. The release mechanism 16 may be of any known construction and is shown for convenience to include a mounting plate 64 secured to the ski in any suitable manner as by screws 66. Plate 64 is provided with upstanding sides 68 to support the remainder of the mechanism. Formed in side plates 68 are slots 70 extending between the plates and in which rides a pin 72. Pin 72 is received in the head 74 of a threaded stud 76 extending rearwardly of the mounting plate 64. Surrounding the stud 76 are compression springs 78 and 80, biasing between a nut 82 on the end of stud 76 and a spring retainer 84 secured between the side walls 68. It is apparent that the threaded stud 76 may move axially of the assembly against the force of the springs 78 and 80.

Also received on the pin 72 and extending forwardly from the head 74 of stud 76 is a yoke member 86, carrying at its forward end a pivot pin 88. Pivoting on pin 88 is a channel shaped lever 90 which may be raised and lowered about the pin 88. Lever 90 carries a U-shaped member 92 pivotally secured to the lever 90 as by pins 94. U-shaped member 92 receives a bolt or threaded stud 96 having an enlarged head 98 within the U-shaped member 92. The threaded stud 96 extends to a tubular member 100 terminating in a rolled flange 102 which receives the loop 54 of the cable 48. The rearward end 104 of tubular member 100 is threaded to receive the threaded stud 96. Also disposed on stud 96 and secured thereto is a knurled member 106 that permits finger adjustment of the threaded stud 96 relative to the tubular member 104. When the proper position is reached, as will become hereinafter more apparent, a lock nut 108 may be tightened against the member 104 to prevent rotating movement of the threaded stud 96.

Figure 2:
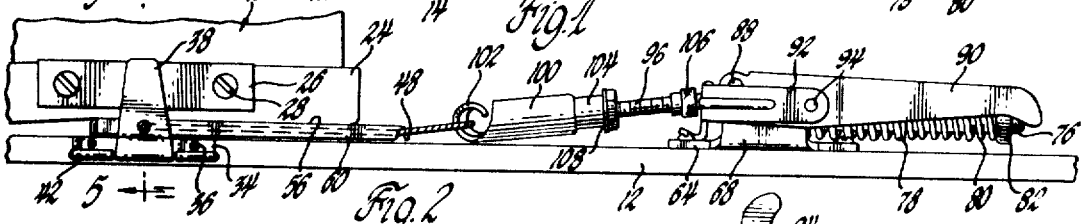
FIGURE 2 is an enlarged view of the portion of FIGURE 1 showing the ski binding mechanism secured to the ski and the ski boot clamped to the ski.
Figure 3:
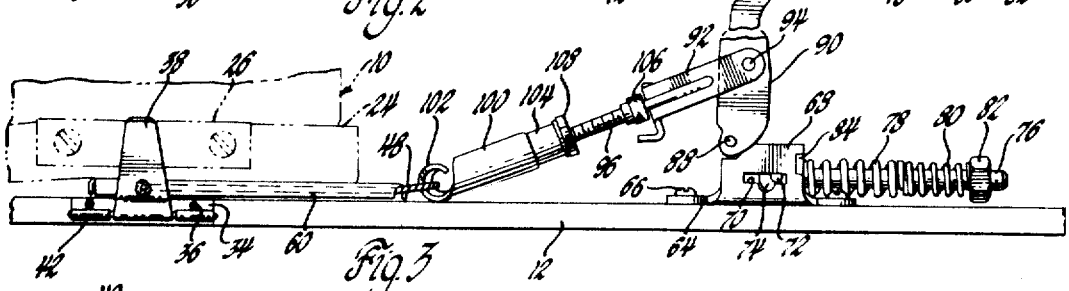
FIGURE 3 is a view similar to FIGURE 2 illustrating the ski binding mechanism in an open or nonclamping position.
Figure 4:
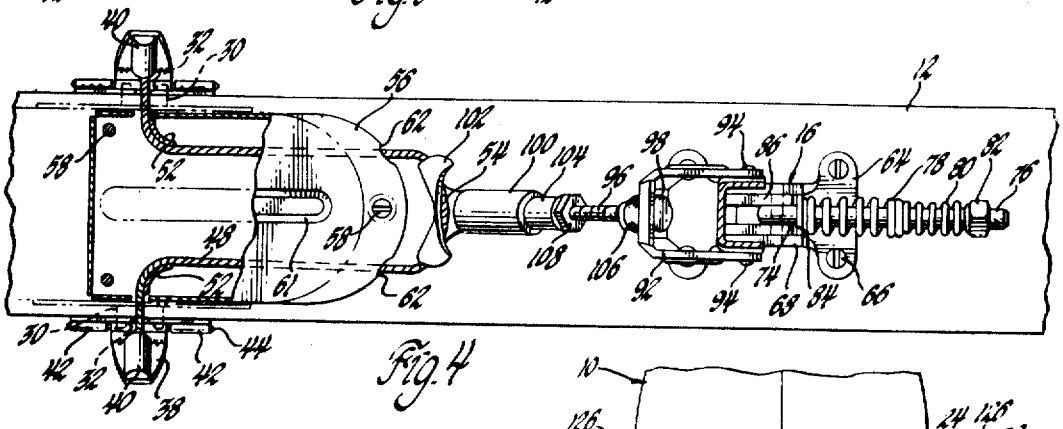
FIGURE 4 is a plan view of the ski and ski binding assembly, as illustrated in FIGURE 3, with parts broken away and in section to illustrate the positions of the various members.

It is thus apparent that the compression springs 78 and 80 act through the yoke member 86 and its pivot pin 88, to the lever 90 and from the lever through the threaded means to the cable 48. With the lever in its downward position, as illustrated in FIGURE 2, the pivot pin 94 is disposed below the pivot pin 88. Thus, the spring force acting on the lever 90 tends to cause the lever to pivot about pin 88 in a clockwise direction, thus maintaining the lever in its closed position. When the lever is raised for releasing the clamping mechanism 14, as illustrated in FIGURE 3, the pivot pin 94 is above the pivot pin 88 and thus the spring force acting against the lever 90 is in a counterclockwise direction, tending to open the lever 90 and maintain it in such position.

Figure 6:
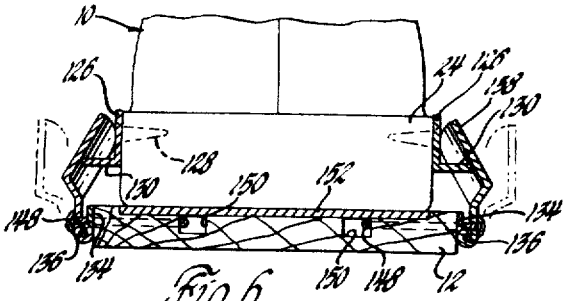
FIGURE 6 is a sectional view similar to FIGURE 5 showing a modification of the ski binding mechanism and the positions of its various parts.
Figure 7:
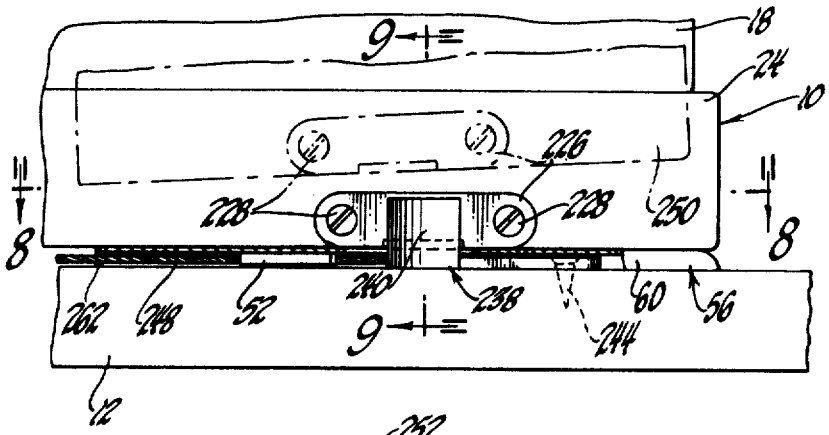
FIGURE 7 is a side view of a portion of a ski, ski boot and ski binding assembly, illustrating another form of the invention, with parts broken away and in section to show the positions of the various parts.
Figure 8:
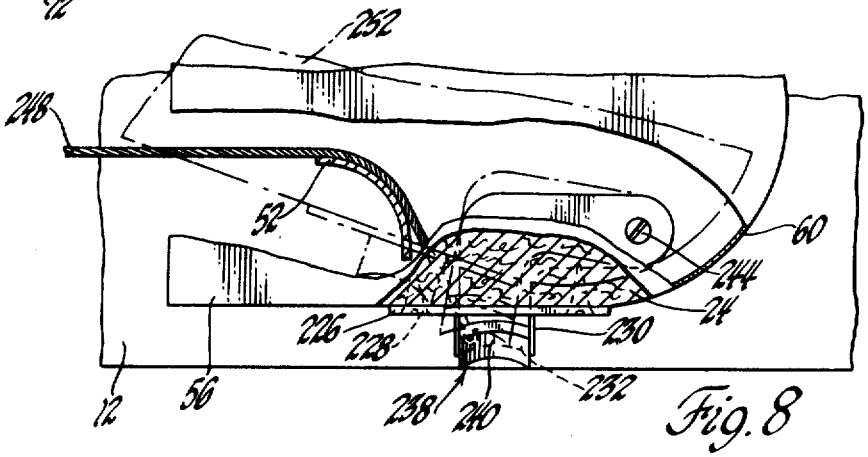
FIGURE 8 is a cross-sectional view of the structure shown in FIGURE 7, taken substantially along the line 8—8 of FIGURE 7 and looking in the direction of the arrows.
Figure 9:
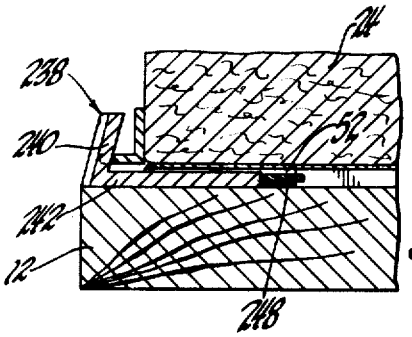
FIGURE 9 is a transverse cross-sectional view of the structure shown in FIGURE 7, taken substantially along the line 9—9 of FIGURE 7 and looking in the direction of the arrows.

Referring now to FIGURE 6, a modification of the clamping means is illustrated. The ski boot 10 and sole 20 are provided with plate members 126 secured to the opposite sides of the sole 20 in any suitable manner, as by screws 128. Plates 126 have extending outwardly therefrom lugs or protuberances 130, convex at their outward ends. Secured to ski 12 are plate members 134 which support pivot pins 136. Pivotally secured on the pins 136 are the clamping arms 138 which angle inwardly toward the ski when in the clamping position. Arms 138 have concave inner surfaces complementary to the convex ends on the lugs 130. Suitably secured to the clamp arms 138 is a cable 148 extending in a manner similar to the cable 48 of FIGURES 1 through 5.

Also illustrated in FIGURE 6 is a modification in the mounting of the cable 148 relative to the ski 12. Rather than mount cable 148 above the ski, it may be desirable to provide channels 150 in the ski 12, properly shaped to allow the cable 148 to change direction from axially of the ski to laterally of the ski for connection with the clamping members 138. In order to protect the cable and prevent snow and ice from impeding the action of the cable, a suitable plate 152 may be provided and be secured to the ski 12 in any suitable manner.

The operation of the ski binding mechanism is as follows: When the skiers desires to mount the skis 12, the boot 10 is placed so as to position the heel 24 of the sole 20 on the plate 56. The lugs 30 extending outwardly from the boot will then be properly positioned to receive the clamp arms 38. Lever 90 may then be lowered from a position similar to that of FIGURE 3 to a position such as that of FIGURE 2, drawing the tubular member 100, and thus the cable 48, rearwardly of the ski boot 10. The clamping arms 38 are drawn inwardly toward the ski boot 10 and clampingly engage the lugs 30 extending from the boot sole. Once the lever is locked in position, the ski boot 10 is properly affixed to the ski 12.

Of course, it is important to have the release mechanism 16 properly adjusted for the desired force on the clamping members 38. This may be accomplished by rotating the threaded member 96 by means of the knurled knob 106 to provide the proper force application. The springs 78 and 80 provide the safety feature for the mechanism. Under fall conditions of any type the ski boot heel will tend to separate from the ski 12 due to the weight of the skier or the momentum caused by the fall. At such time the springs 78 and 80 may be overcome, permitting the lugs 30 to disengage from the clamp arms 38. It is apparent that different weight skiers and skiers of differing abilities will require different adjustments and different clamping forces on the ski boot by means of the clamping arms 38. Should the spring force need to be adjusted to accommodate the varying weights of skiers and to permit individual skiers to adjust the force necessary to release the boot from the binding, the nut 82 on the end of threaded stud 76 may be rotated toward or away from the springs 78 and 80 to set the spring force at the proper point. For example, an accomplished skier would set the spring force to hold the boot and ski together during higher loads than would a beginner. A beginner would normally want his ski boots to be released from the skis more readily due to the greater frequency of falls and the lesser control over such falls.

Considering now the position of the plate 26 and the lugs 30 on the ski boot sole 20, it is important to locate the plate 26 rearwardly of the point of application of heel lifting force on the ski boot 10. As has been pointed out, it is necessary for the ski boot to be rigidly affixed to the ski during the skiing operation. Any lifting of the heel from the ski will prevent proper control of the ski. With normal ski boot construction, it is found that the application of heel lifting force is at a point adjacent the ball of the skier's foot. This is particularly true since the skier has his weight forward when skiing downhill to maintain the proper balance and proper skiing position. Thus, the ski boot must be clamped to the ski rearwardly of this point. It is apparent that the farther rearwardly of the ski boot sole the binding is located, the less clamping force will be required to prevent the heel from lifting from the ski. The particular position of the clamping means relative to the ski boot, rearwardly of the point of force application, depends primarily upon the desires of the skier, although for best operation of the clamping mechanisms, it is desirable to place the device somewhere in the heel area of the sole 20.

For purposes of illustration and description, the release mechanism 16 has been shown and described as being mounted on the ski 12 rearwardly of the ski boot 10. It will be appreciated, however, that the release mechanism could as well be mounted forwardly of the boot 10 without changing the concept of the invention. In mounting the release mechanism forwardly of the boot, a suitable plate would be disposed between the boot 10 and the ski 12 so as to provide means for permitting the cable 48 to run beneath the boot 10 unimpeded. Alternatively, the ski may be provided with suitable grooves, as in the modification shown in FIGURE 6, to provide passage of the cable beneath the forward part of the boot sole 20. The design of the ski and the desire of the skier would easily determine the location of the release mechanism 16 either forwardly of the ski boot 10 or rearwardly thereof.

Referring next to FIGURES 7 through 10, another form of the ski binding mechanism is there-illustrated. The ski boot 10 is mounted on the ski 12 by a side binding assembly which attaches to the ski boot sole and is shown for illustration purposes to be adjacent the heel portion 24 of the boot. Mounted on the heel portion 24 are side plates 226 secured in place by suitable screws or the like 228. A protuberance, or outwardly directed flange, 230 is provided with a concave end 232, in a manner hereinbefore described, to receive the clamping members, illustrated generally by the numeral 238.

Clamping members 238 have upwardly and inwardly directed protuberance or lug engaging portions 240 arcuate in shape to be received within the concave end 232 of the protuberances 230. At the lower end of the lug engaging portions 240 is an L-shaped plate portion 242 which overlies the surface of the ski 12, and which is pivotally mounted on the ski by means of a pivot pin, or screw, 244. The axis of the pivot 244 is perpendicular to the surface of the ski, and the clamping members 238 may swing inwardly and outwardly about such pivot.

A cable 248 is attached to each of the clamping members 238 in any suitable manner and is directed either forwardly or rearwardly by an arcuate rib 52 disposed beneath the plate 56 mounted on the ski 12, and spacing the bottom of the boot sole therefrom. A front wall 262 is provided on the plate 56 to prevent snow and the like from collecting beneath the plate 56. As hereinbefore described, the cable 248 may extend either forwardly or rearwardly, depending upon the desired location of the spring release mechanism.

It will be apparent that in the operation of the binding assembly, the clamping members 238 may be pivoted inwardly about the pivots 244 to engage the lugs or protuberances 230 mounted on the boot sole. The angularly inwardly directed lug engaging portions 240 assure proper retention of the boot in its position on the ski. Disengagement of the boot from the ski during incipient fall conditions or the like, may be accomplished by the heel portion 24 lifting upwardly, or pivoting about the point of application of heel lifting force, as illustrated at 250 in dashed and dotted lines in FIGURE 7. Similarly, under twisting conditions where the boot may twist, as illustrated in dashed and dotted lines in FIGURE 8 at 252, the arcuate shape of the lug ends 232 and the arcuate shape of the lug engaging portions 240 permit such disengagement by forceable movement against the spring biased clamping members 238.

Figure 10:
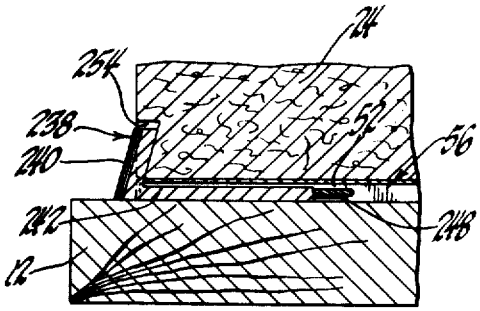
FIGURE 10 is a view similar to FIGURE 9, showing a modification in the ski boot sole construction.

FIGURE 10 illustrates a slight modification in the above-described structure wherein the side plates 226 and the protuberances 230 are eliminated. A suitable groove 254 of desirable shape may be cut into the side of the ski boot sole 24, and the clamping members 238 contacting directly the ski boot sole within the slot 254. The operation of such a mounting is substantially as above-described.

Figure 11:
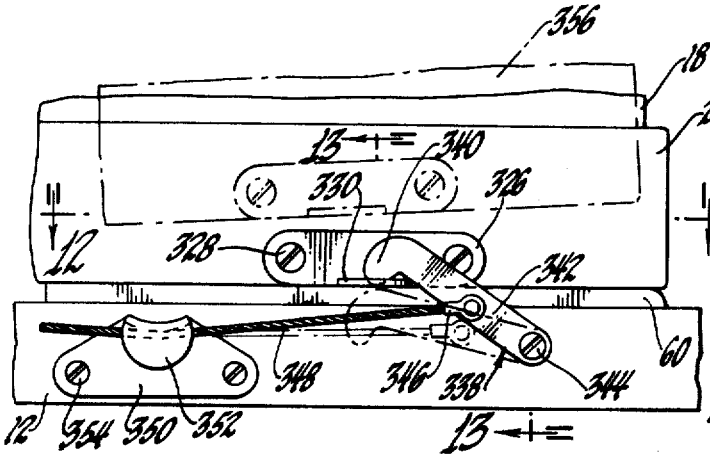
FIGURE 11 is a side view of a portion of a ski, ski boot and ski binding assembly, illustrating yet another form of the invention, with parts broken away and in section to show the positions of the various parts.
Figure 12:
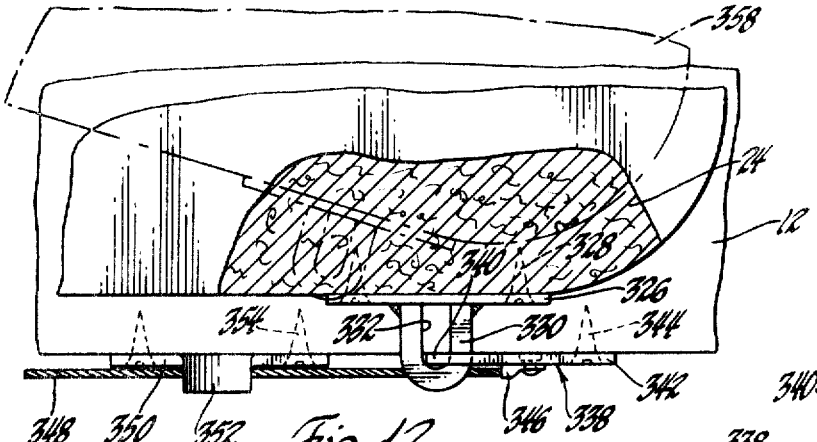
FIGURE 12 is a cross-sectional view of the structure shown in FIGURE 11, taken substantially along the line 12—12 of FIGURE 11 and looking in the direction of the arrows.
Figure 13:
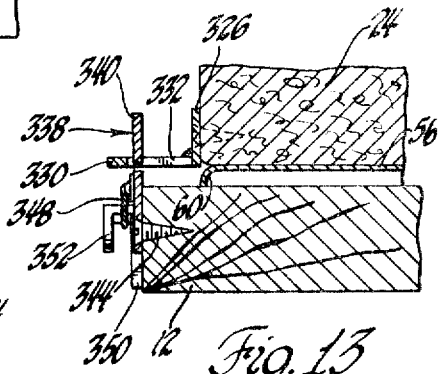
FIGURE 13 is a transverse cross-sectional view of the structure shown in FIGURE 11, taken substantially along the line 13—13 of FIGURE 11 and looking in the direction of the arrows.

In FIGURES 11 through 13, yet another form of binding assembly is illustrated, wherein the ski boot sole 24 is mounted on the ski 12 on top of the plate 56 with its downwardly depending side walls 60. Secured to the sides of the ski boot sole 24, and again for illustration purposes, the binding is shown as being mounted toward the rear of the heel 24. Side plates 326 are secured in the the sole 24 by screws or the like, 328. Extending out wardly from the plates 326 are U-shaped protuberances, or lugs, 330 having inner slots or openings 332. Slots 332 in the protuberances 330 receive the clamping members, illustrated generally by the numeral 338.

Clamping members 338 are L-shaped members having protuberance engaging portions 340 receivable in the openings or slots 332. Main portions 342 of the clamping members are provided with suitable apertures at the opposite end thereof from the lug engaging portions 340 to receive a pivot pin or screw 344 which is received in turn directly in the side of the ski 12. The pivot axis of the pivot pin, or screw, 344 is transverse of the ski, and the direction of pivotal movement of the clamping members 338 is in vertical planes parallel to the axis of the ski 12. A cable 348 is secured to the main portion 342 of the clamping members 338 by means of a suitable connection, illustrated by the numeral 346. Such cable may extend forwardly or rearwardly as above-described.

Adjacent the mounting of the clamping members 338 is a cable directing plate 350, having a downwardly depending flange 352 to receive the cable 348 and keep the cable out of the way of the boot 24 and the binding assembly. Plate 350 is secured to the ski in any suitable manner as by screws, or the like, 354.

Since the cable 348 is directed along side the ski 12, rather than along the top surface, the use of the intermediate plate 56 may or may not be desirable. The use of such plate would depend upon the type of ski boot, the configuration of the ski boot sole, as well as the configuration of the upper surface of the ski.

In operating the binding mechanism illustrated in FIGURES 11 through 13, it will be apparent that actuation of the safety clamping mechanism will pivot the clamping members 338 downwardly against the protuberances 330, with the lug engaging portions 340 received in the slot or opening, 332. The boot may release from the clamping members 338 in a pivotally upward direction, as indicated in dashed and dotted lines by the numeral 356 in FIGURE 11. Similarly, for a twist release, as illustrated at 358 in dashed and dotted lines in FIGURE 12, the protuberance will disengage from the clamping members 338 permitting the desired release.

Figure 14:
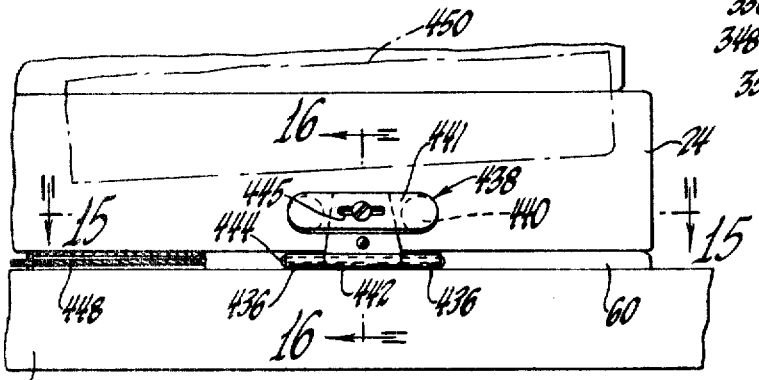
FIGURE 14 is a side view of a portion of a ski, ski boot and ski binding assembly, illustrating still another form of the invention, with parts broken away and in section to show the positions of the various parts.
Figure 15:
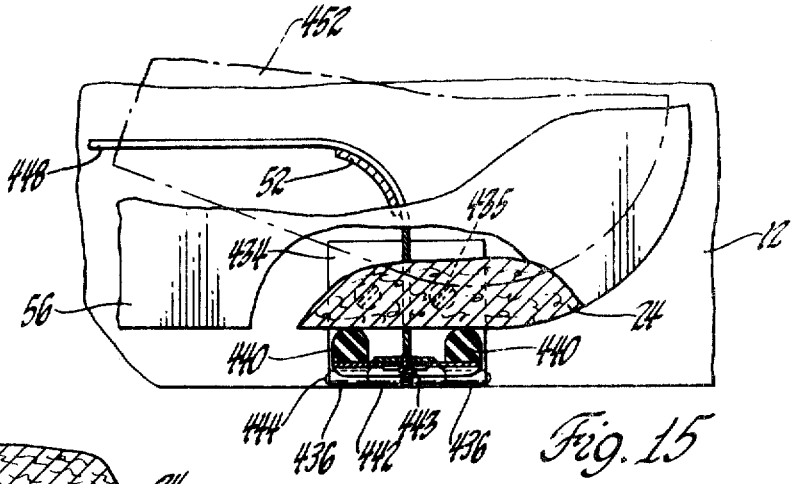
FIGURE 15 is a cross-sectional view of the structure shown in FIGURE 14, taken substantially along the line 15—15 of FIGURE 14 and looking in the direction of the arrows.
Figure 16:
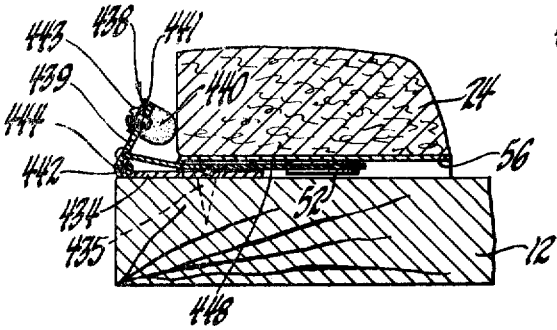
FIGURE 16 is a transverse cross-sectional view of the structure shown in FIGURE 14, taken substantially along the line 16—16 of FIGURE 14 and looking in the direction of the arrows.

Referring now to FIGURES 14 through 16, still another form of binding assembly is shown which coacts only with the side of the ski boot to hold the boot sole 24 against the ski 12. In this form of the invention, the clamping members, illustrated generally by the numeral 438, act directly on the ski boot sole 24. A plate member 434 is secured in any suitable manner, as by screws 435, to the upper surface of the ski 12 or, alternatively, may be secured to the side wall of the ski 12 in a manner similar to the plate 34 of the modification shown in FIGURES 1 through 5. Plate 434 terminates adjacent the edge of the ski in rolled portions 436 spaced apart a suitable distance, and receiving the pivot pin 444. Extending angularly inwardly and upwardly from the plate 434 and pivot pin 444 is a clamping plate 439 having a lower rolled portion 442 received about the pivot pin 444 and between the rolled portions 436 of the plate 434. Secured in the plate 439 are a pair of bumper members 440, mounted on a cross plate 441 and secured to the member 439 by means of a screw 443. Cross plate 441 may be provided with a slot 445 to permit limited longitudinal adjustment of the plate 441 and bumper members 440 on the ski boot 24.

Bumper members 440 may be made of any suitable resilient material which has sufficient hardness to properly clamp against the ski boot sole 24 and frictionally maintain engagement therewith. Thus, the clamping members 438 pivot inwardly and outwardly toward and against the ski boot sole on the pivot pin 444 having an axis located in a direction parallel to the axis of the ski.

A cable 448 is secured in any suitable manner in the plate member 439, and directed either forwardly or rearwardly by the arcuate rib 52 disposed between the plate 56 and the ski 12 as hereinbefore described. Cable 448 extends to the safety clamping mechanisms, and it is apparent that upon actuation of the clamping mechanism, the cable will pull the clamping members 438 into engagement with the ski boot sole 24 to maintain the boot on the ski. Should a forward fall occur, the boot may lift away from the ski, as illustrated in dashed and dotted lines at 450 in FIGURE 14, and the boot may twist from the binding assembly, as illustrated in dashed and dotted lines at 452 in FIGURE 15. Such release is caused by forces overcoming the spring force on the clamping mechanism.

The various forms of the binding assembly, hereinbefore illustrated and described, operate on the basis of pivotal movement of the clamping members with the pivots arranged in various axes. Referring now to FIGURES 17 through 21, one more form of the invention is illustrated wherein the clamping members slide, or reciprocate, relative to the ski rather than pivot.

Figure 20:
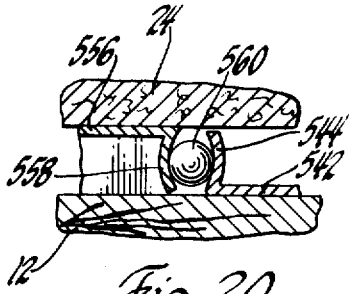
FIGURE 20 is an enlarged sectional view of a portion of the structure shown in FIGURE 17, to illustrate the manner of movement of the binding assembly.
Figure 19:
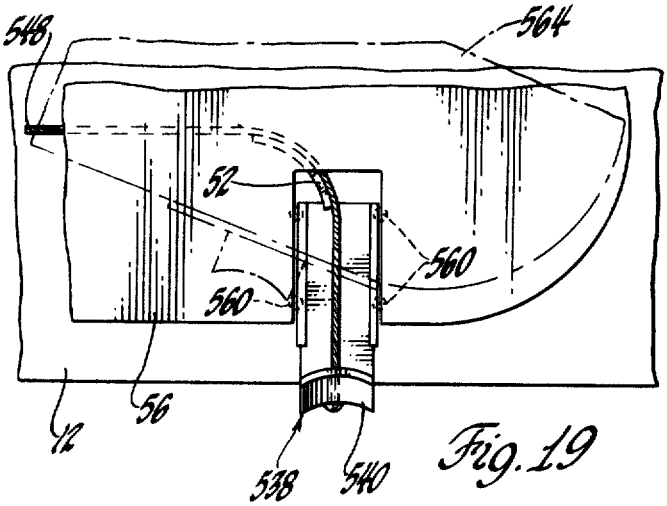
FIGURE 19 is a view similar to FIGURE 18, with the ski boot removed, to illustrate the mounting of the binding assembly.
Figure 21:
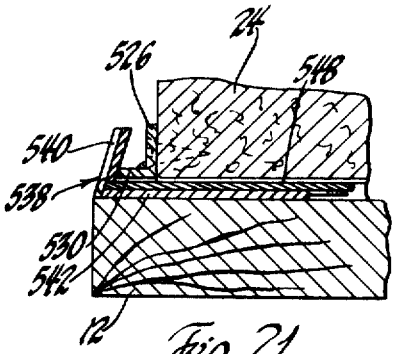
FIGURE 21 is a transverse cross-sectional view of the structure shown in FIGURE 17, taken substantially along the line 21—21 of FIGURE 17 and looking in the direction of the arrows.

The ski boot sole 24 is provided with a side plate 526 secured to the sole by means of screws, or the like, 528. Extending outwardly from the plates 526 are protuberances or lugs 530 provided with concave ends 532 as hereinbefore described. Each of the lugs or protuberances 530 receives a clamping member, illustrated generally by the numeral 538, which is provided with a lug engaging portion 540 arcuately formed to be suitably received in the concave end 532 of the lug 530. As best illustrated in FIGURE 21, the clamping members 538 are substantially L-shaped, with the clamping portions 540 angling upwardly and inwardly to provide the proper biasing force. The lower or longer portion 542 of the clamping member 538 extends transversely and inwardly of the ski 12 and along the upper surface thereof. The side edges of the portion 542 are turned upwardly, as at 544, and are arcuate in cross-section, as best illustrated in FIGURE 20. The plate 556, disposed between the boot sole 24 and the ski 12, is provided with downwardly depending arcuate flanges 558, extending adjacent and parallel to the flanges 544 on the members 542. A suitable number of balls 560 are disposed between the two arcuate flanges 544 and 558 to permit relatively frictionless movement of the clamping members 538 relative to the ski 12.

A cable 548, extending forwardly or rearwardly to the safety release mechanism and directed along the surface of the ski by the arcuate flange 52, is secured in the clamping members 538 in any suitable manner. As the cable 548 is tensioned, due to the actuation of the safety release mechanism, the clamping members 538 are pulled inwardly of the ski into engagement with the lugs 530 for proper retention of the boot sole 24 on the ski 12. Movement of the clamping members 538 is eased by the balls 560 mounted between the adjacent arcuate flanges.

Figure 17:
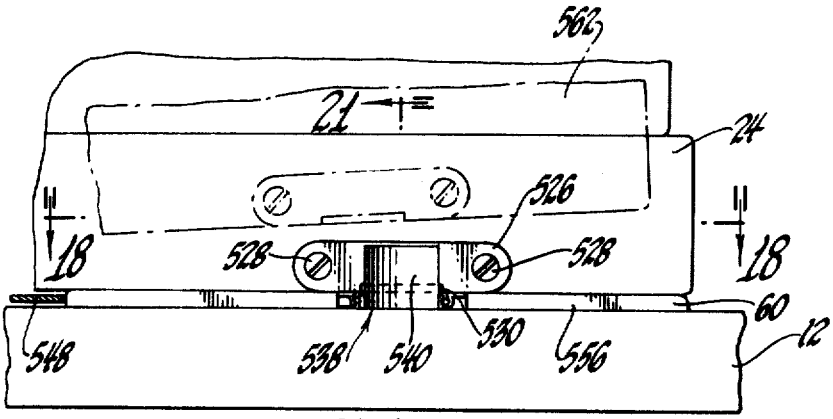
FIGURE 17 is a side view of a portion of a ski, ski boot and ski binding assembly, illustrating one more form of the invention, with parts broken away and in section to show the positions of the various parts.
Figure 18:
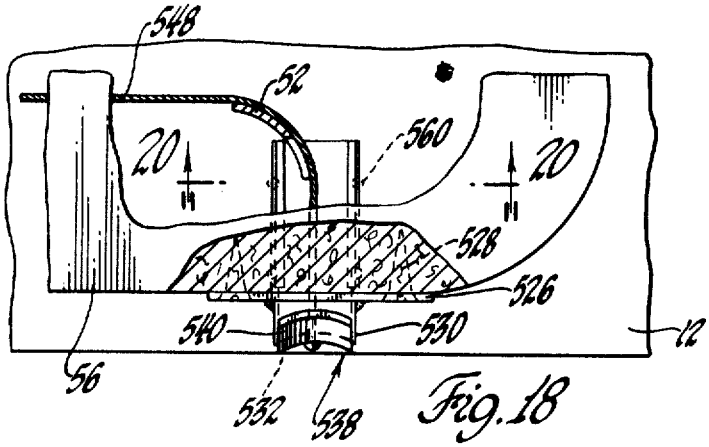
FIGURE 18 is a cross-sectional view of the structure shown in FIGURE 17, taken substantially along the line 18—18 of FIGURE 17 and looking in the direction of the arrows.

Should an upward pivotal movement require release of the boot sole 24 from the binding assembly, such as illustrated at 562 in dashed and dotted lines in FIGURE 17, the release force in the safety release mechanism will be overcome, allowing the boot to release. Again, should a twisting movement occur, such as illustrated in dashed and dotted lines at 564 in FIGURE 19, such as to overcome the force of the spring in the safety release mechanism, the boot sole 24 will cam out of the binding mechanisms.

In the modification illustrated in FIGURES 17 through 21, it will also be apparent that a suitable groove may be formed in the boot sole 24, as illustrated in FIGURE 10, to replace the plate 526 and lug 530 secured to the side of the boot. Such arrangement would depend upon the desires of the skier.

Thus, several forms of a ski binding concept are shown which will releasably secure a ski boot to a ski through side mountings only and do not require the usual heel and toe connection to the ski. The application of forces is such that the ski binding mechanisms need only coact with the sides of the sole of the ski boot and rearwardly of the point of application of heel lifting force to properly maintain the boot on the ski during normal skiing conditions. Spring biased release means are provided to protect the skier against incipient fall conditions when he might injure himself or otherwise require immediate removal of the ski boot from the binding mechanism. The devices are relatively simple to manufacture and operate and have few moving parts, making any of the assemblies extremely economical and efficient.

Other modifications and changes will occur to those having skill in the art after having had reference to the foregoing description and drawings. However, it is not intended to limit the scope of the invention to the foregoing but by the scope of the following claims, in which I claim:

1. In combination; a ski, a ski boot, and a binding mechanism for binding said ski boot to said ski, said mechanism coacting only with the side portions of said ski boot and being the only means by which said ski boot is secured to said ski, and said mechanism being positioned on said ski rearwardly of the point of application of heel lifting force on said ski boot.

2. The combination set forth in claim 1 wherein said binding mechanism is positioned on said ski at the rear of the sides of said ski boot.

3. In combination; a ski, a ski boot, binding means for securing said ski boot on said ski, and means on said ski boot for receiving and coacting with said binding means, said means on said ski boot being located forwardly of the rearward end of said ski boot and rearwardly of the point of application of heel lifting force on said ski boot, and siad binding means and said means on said ski boot being the only securement of said ski boot on said ski.

4. The combination set forth in claim 3 and further including safety release means operatively connected to said binding means for releasing said binding means from said ski boot.

5. In combination; a ski, a ski boot, binding means for securing said ski boot on said ski, and means on said ski boot for receiving and coacting with said binding means, said means on said ski boot being located forwardly of the rearward end of said ski boot and rearwardly of the point of application of heel lifting force on said ski boot, said binding means including a member mounted on said ski for movement into and out of engagement with said means on said ski boot, said means on said ski boot and said binding means being the only securement of said ski boot on said ski.

6. The combination set forth in claim 5 wherein said member is slidably mounted on said ski.

7. The combination set forth in claim 6 wherein said member is slidable along an axis transverse of said ski.

8. In combination; a ski, a ski boot, binding means for securing said ski boot on said ski, and means on said ski boot for receiving and coacting with said binding means, said means on said ski boot being located forwardly of the rearward end of said ski boot and rearwardly of the point of application of heel lifting force on said ski boot, said binding means including a member pivotally mounted on said ski for pivotal movement into and out of engagement with said means on said ski boot, said means on said ski boot and said binding means being the only securement of said ski boot on said ski.

9. The combination set forth in claim 8 wherein the pivot axis of said member is parallel to the longitudinal axis of said ski.

10. The combination set forth in claim 8 wherein the pivot axis of said member is transverse of said ski.

11. The combination set forth in claim 8 wherein the pivot axis of said member is normal to the upper surface of said ski.

12. The combination set forth in claim 8 wherein said binding means includes a pair of said members pivotally mounted on opposite sides of said ski and pivotal in opposite directions to engage said means on said ski boot.

13. The combination set forth in claim 8 and further including safety release means operatively connected to said binding means for releasably securing said binding means to said ski boot.

14. A ski binding mechanism coacting only with the side portions of a ski boot to releasably retain the ski boot upon a ski and being the only securement of said ski boot on said ski, said mechanism comprising:

a clamping member adapted to be movably secured to the ski;

means on said ski boot for receiving and coacting with said clamping member to retain said ski boot on said ski, said means being located rearwardly of the point of application of heel lifting force on said ski boot;

and actuating means operatively connected to said clamping member and operable to clamp said member against said means on said ski boot to resist movement of said ski boot away from said ski.

15. The binding mechanism set forth in claim 14 wherein said clamping member is adapted to be slidably mounted on said ski and slidable into engagement with said means on said ski boot.

16. The binding mechanism set forth in claim 15 wherein said clamping member is adapted to slide transversely of said ski.

17. The binding mechanism set forth in claim 15 wherein said means on said ski boot includes a groove formed therein to receive said clamping member.

18. The binding mechanism set forth in claim 15 wherein said means on said ski boot includes an outwardly directed protuberance to receive and coact with said clamping member.

19. The binding mechanism set forth in claim 14 wherein said clamping member is adapted to be pivotally mounted on said ski and pivotal into engagement with said means on said ski boot.

20. The binding mechanism set forth in claim 19 wherein said clamping member has a pivot axis parallel to the longitudinal axis of said ski.

21. The binding mechanism set forth in claim 19 wherein the pivot axis of said clamping member is transverse of said ski.

22. The binding mechanism set forth in claim 19 wherein the pivot axis of said clamping member is normal to the surface of said ski.

23. The binding mechanism set forth in claim 19 wherein said actuating means includes a spring member.

24. The binding mechanism set forth in claim 19 wherein said means on said ski boot includes a groove formed therein to receive said clamping member.

25. The binding mechanism set forth in claim 19 wherein said means on said ski boot includes an outwardly directed protuberance to receive and coact with said clamping member.

26. A ski binding mechanism coacting only with the side portions of a ski boot to releasably retain the boot upon a ski, said mechanism comprising:

a member adapted to be attached to each side of the ski boot sole rearwardly of the point of application of heel lifting force on said ski boot, each of said members having an outwardly directed protuberance;

clamping members adapted to be movably secured to the ski adjacent the position of said protuberances and movable into engagement with said protuberances;

and actuating means operatively connected to said clamping members and operable to move said members into clamping engagement with said protuberances to resist movement of the ski boot away from the ski.

27. The ski binding mechanism of claim 26 wherein said members are adapted to be attached to said ski boot adjacent the position of the ball of the foot of the user.

28. The ski binding mechanism of claim 26 wherein said members are adapted to be attached to said ski boot adjacent the rear of the heel thereof.

29. The ski binding mechanism of claim 26 wherein said members are adapted to be attached to said ski boot between a position adjacent the ball of the user's foot and the extreme rear of the heel of said ski boot.

30. A ski binding mechanism coacting only with the side portions of a ski boot to releasably retain the boot upon a ski, said mechanism comprising:

a member adapted to be attached to each side of the ski boot sole rearwardly of the point of application of heel lifting force on said ski boot, each of said members having an outwardly directed protuberance;

clamping members adapted to be slidably secured to the ski adjacent the position of said protuberances and slidable transversely of said ski into engagement with said protuberances;

and actuating means operatively connected to said clamping members and operable to slide said members against said protuberances to resist movement of the ski boot away from the ski.

31. A ski binding mechanism coacting only with the side portions of a ski boot to releasably retain the boot upon a ski, said mechanism comprising:

a member adapted to be attached to each side of the ski boot rearwardly of the point of application of heel lifting force on said ski boot, each of said members having an outwardly directed protuberance;

clamping members adapted to be secured to the ski adjacent the position of said protuberances and pivotable into engagement with said protuberances;

and actuating means operatively connected to said clamping members and operable to clamp said members against said protuberances to resist movement of the ski boot away from the ski.

32. The ski binding mechanism of claim 31 wherein said protuberances each include an outwardly directed tab having clamping member engaging means thereon, and said clamping members each including complementary tab engaging means.

33. The ski binding mechanism of claim 32 wherein said clamping member engaging means includes a concave opening in the end of said tab, and said tab engaging means includes a convex portion on said clamping members receivable in said concave opening.

34. The ski binding mechanism of claim 33 wherein said clamping members each pivot about an axis parallel to the longitudinal axis of said ski.

35. The ski binding mechanism of claim 33 wherein said clamping members each pivot about an axis normal to the surface of said ski.

36. The ski binding mechanism of claim 31 wherein said actuating means includes spring biased lever means adapted to be secured to the ski at a point spaced from the position of the ski boot on the ski, and cable means extending between said lever means and said clamping members and operatively connected thereto, whereby actuation of said lever means in a boot clamping direction pulls said cable means and pivots said clamping members toward and into clamping engagement with said protuberances.

37. The ski binding mechanism of claim 36 and further including a heel plate adapted to be secured to said ski and having an upper wall spaced from said ski, said plate being adapted to provide a space between said ski and said sole for said cable means.

38. The ski binding mechanism of claim 31 wherein said clamping members have portions angularly disposed toward said ski boot at the points of engagement with said protuberances.

39. A ski boot and ski binding assembly coacting only with the side portions of a ski boot and releasably retaining said ski boot on a ski and comprising:

means on each side of the ski boot rearwardly of the point of application of heel lifting force on said ski boot;

a clamping member adapted to be secured to each side of said ski adjacent the positions of said means on said ski boot and movable into engagement with said means;

and actuating means operatively connected to said clamping members and operable to clamp said member against said means on said ski boot to resist movement of said ski boot away from the ski.

40. A ski boot and ski binding assembly coacting only with the side portions of said ski boot and releasably retaining said ski boot on a ski and comprising:

a member secured to each side of said ski boot and rearwardly of the point of application of heel lifting force on said ski boot;

a clamping member adapted to be secured to each side of the ski adjacent the positions of said members on said ski boot and pivotable along an axis normal to the surface of said ski into engagement with said members on said ski boot;

and actuating means operatively connected to said clamping members and adapted to be secured to the ski, said means being operable to clamp said clamping members against said members on said ski boot to resist movement of the rearward portion of said ski boot away from said ski.

41. The ski boot and ski binding assembly of claim 40 wherein said members on said ski boot are adapted to be attached to said ski boot adjacent the position of the ball of the foot of the user.

42. The ski boot and ski binding assembly of claim 40 wherein said members on said ski boot are adapted to be attached to said ski boot adjacent the rear of said heel portion.

43. The ski boot and ski binding assembly of claim 40 wherein said members on said ski boot are adapted to be attached to said ski boot between a position adjacent the ball of the user's foot and the extreme rear of said heel portion of said ski boot.

44. The ski binding mechanism of claim 40 wherein said members on said ski boot each include an outwardly directed tab having clamping member engaging means thereon, and said clamping members each including complementary tab engaging means.

45. The ski binding mechanism of claim 40 wherein said actuating means includes spring biased lever means adapted to be secured to the ski at a point spaced from the position of the ski boot on the ski, and cable means extending between said lever means and said clamping members and operatively connected thereto, whereby actuation of said lever means in a boot clamping direction pulls said cable means and pivots said clamping members toward and into engagement with said members on said ski boot.

46. The ski binding mechanism of claim 45 and further including a heel plate adapted to be secured to said ski and having an upper wall spaced from said ski, said plate being adapted to provide a space between said ski and said ski boot for said cable means.

47. A ski boot and ski binding assembly coacting only with the side portions of said ski boot and releasably retaining said ski boot on a ski and comprising:

a member secured to each side of said ski boot and rearwardly of the point of application of heel lifting force on said ski boot;

a clamping member adapted to be secured to each side of the ski adjacent the position of said members on said ski boot and pivotable along an axis transverse of said ski into engagement with said members on said ski boot;

and actuating means operatively connected to said clamping members and adapted to be secured to the ski, said means being operable to clamp said clamping members against said members on said ski boot to resist movement of the rearward portion of said ski boot away from said ski.

48. The ski boot and ski binding assembly of claim 47 wherein said members on said ski boot are adapted to be attached to said ski boot adjacent the position of the ball of the foot of the user.

49. The ski boot and ski binding assembly of claim 47 wherein said members on said ski boot are adapted to be attached to said ski boot adjacent the rear of said heel portion.

50. The ski boot and ski binding assembly of claim 47 wherein said members on said ski boot are adapted to be attached to said ski boot between a position adjacent the ball of the user's foot and the extreme rear of said heel portion of said ski boot.

51. The ski boot and ski binding assembly of claim 47 wherein said members on said ski boot each include an outwardly directed tab having an aperture therein, and said clamping members each include means receivable in said aperture.

52. The ski boot and ski binding assembly of claim 47 wherein said actuating means includes spring biased lever means adapted to be secured to the ski at a point spaced from the position of the ski boot on the ski, and cable means extending between said lever means and said clamping members and operatively connected thereto, whereby actuation of said lever means in a boot clamping direction pulls said cable means and pivots said clamping members toward and into engagement with said members on said ski boot.

53. The ski binding mechanism of claim 52 and further including a heel plate adapted to be secured to said ski and having an upper wall spaced from said ski, said plate being adapted to provide a space between said ski and said sole for said cable means.

54. A ski boot and ski binding assembly coacting only with the side portions of said ski boot and releasably retaining said ski boot on a ski and being the only means of securement of said ski boot on the ski and comprising:

a clamping member adapted to be secured to each side of the ski adjacent said ski boot and pivotable into engagement therewith, said members being located on said ski rearwardly of the point of application of heel lifting force on said ski boot;

friction members on each of said clamping members to frictionally engage said ski boot;

and spring actuating means operatively connected to said clamping members and adapted to be secured to the ski, said means being operable to clamp said clamping members and said friction members against said ski boot to resist movement of the rearward portion of said ski boot away from said ski.

55. The ski boot and ski binding assembly of claim 54 wherein said clamping members are adapted to be attached to said ski adjacent the position of the ball of the foot of the user.

56. The ski boot and ski binding assembly of claim 54 wherein said clamping members are adapted to be attached to said ski adjacent the rear of said heel portion of said ski boot.

57. The ski boot and ski binding assembly of claim 54 wherein said clamping members are adapted to be attached to said ski between a position adjacent the ball of the user's foot and the extreme rear of said heel portion of said ski boot.

58. The ski boot and ski binding assembly of claim 54 wherein said actuating means includes spring biased lever means adapted to be secured to the ski at a point spaced from the position of the ski boot on the ski, and cable means extending between said lever means and said clamping members and operatively connected thereto, whereby actuation of said lever means in a boot clamping direction pulls said cable means and pivots said clamping members toward and into engagement wtih said ski boot.

59. The ski boot and ski binding assembly of claim 54 and further including a heel plate adapted to be secured to said ski and having an upper wall spaced from said ski, said plate being adapted to provide a space between said ski and said ski boot for said cable means.

60. A ski boot and ski binding assembly coacting only with the side portions of said ski boot and releasably retaining said ski boot on a ski and comprising:

a member secured to each side of said ski boot and rearwardly of the point of application of heel lifting force on said ski boot;

a clamping member adapted to be secured to each side of the ski adjacent the position of said members on said ski boot and slidable transversely of said ski into engagement with said members on said ski boot;

and actuating means operatively connected to said clamping members and adapted to be secured to the ski, said means being operable to clamp said clamping members against said members on said ski boot to resist movement of the rearward portion of said ski boot away from said ski.

61. The ski boot and ski binding assembly of claim 60 wherein said members on said ski boot are adapted to be attached to said ski boot adjacent the position of the ball of the foot of the user.

62. The ski boot and ski binding assembly of claim 60 wherein said members on said ski boot are adapted to be attached to said ski boot adjacent the rear of said heel portion.

63. The ski boot and ski binding assembly of claim 60 wherein said members on said ski boot are adapted to be attached to said ski boot between a position adjacent the ball of the user's foot and the extreme rear of said heel portion of said ski boot.

64. The ski boot and ski binding assembly of claim 60 where said members on said ski boot each include an outwardly directed tab having clamping member engaging means thereon, and said clamping members each including complementary tab engaging means.

65. The ski boot and ski binding assembly of claim 60 wherein said actuating means includes spring biased lever means adapted to be secured to the ski at a point spaced from the position of the ski boot on the ski, and cable means extending between said lever means and said clamping members and operatively connected thereto, whereby actuation of said lever means in a boot clamping direction pulls said cable means and pivots said clamping members toward and into engagement with said members on said ski boot.

66. The ski boot and ski binding assembly of claim 65 and further including a heel plate adapted to be secured to said ski and having an upper wall spaced from said ski, said plate being adapted to provide a space between said ski and said sole for said cable means.

67. The ski boot and ski binding assembly set forth in claim 60 and further including bearing means disposed between said clamping members and said ski.

68. A ski boot and ski binding assembly coacting only with the side portions of said ski boot and releasably retaining said ski boot on a ski and comprising:

a plate member secured to each side of said ski boot and rearwardly of the point of application of heel lifting force on said sole;

an outwardly directed protuberance on each of said plate members;

a clamping member adapted to be secured to each side of the ski adjacent the position of said protuberances and pivotable along an axis parallel to the longitudinal axis of the ski into engagement with said proturberances, said members being angularly and inwardly inclined;

and actuating means operatively connected to said clamping members and adapted to be secured to the ski, said means being operable to clamp said clamping members against said protuberances to resist movement of the rearward portion of said ski boot away from said ski.

69. The ski boot and ski binding assembly of claim 68 wherein said plate members are adapted to be attached to said ski boot adjacent the position of the ball of the foot of the user.

70. The ski boot and ski binding assembly of claim 68 wherein said plate members are adapted to be attached to said ski boot adjacent the rear of said heel portion.

71. The ski boot and ski binding assembly of claim 68 wherein said plate members are adapted to be attached to said ski boot between a position adjacent the ball of the user's foot and the extreme rear of said heel portion of said sole.

72. The ski boot and ski binding assembly of claim 68 wherein said protuberances each include an outwardly directed tab having clamping member engaging means thereon, and said clamping members each including complementary tab engaging means.

73. The ski binding mechanism of claim 68 wherein said clamping member engaging means includes a concave opening in the end of said tab, and said tab engaging means includes a convex portion on the end of said clamping members receivable in said concave opening.

74. The ski binding mechanism of claim 68 wherein said actuating means includes spring biased lever means adapted to be secured to the ski at a point spaced from the position of the ski boot on the ski, and cable means extending between said lever means and said clamping members and operatively connected thereto, whereby actuation of said lever means in a boot clamping direction pulls said cable means and pivots said clamping members toward and into engagement with said protuberances.

75. The ski binding mechanism of claim 74 and further including a heel plate adapted to be secured to said ski and having an upper spaced from said ski, said plate being adapted to provide a space between said ski and said ski boot for said cable means.

76. A safety binding assembly comprising:

a ski;

a ski boot;

a member secured to each side of said ski boot and rearwardly of the point of application of heel lifting force thereon, said members having outwardly directed tabs;

a clamping member pivotally secured to each side of said ski adjacent said tabs, said clamping members being pivotable along axes normal to the surface of said ski into engagement with said tabs, said clamping members being angularly inwardly directed at the points of engagement with said tabs;

a plate member secured to said ski and having an upper wall spaced therefrom, said plate member enclosing a portion of said clamping members;

cable means having ends secured to said clamping members and extending along said ski beneath said upper surface of said plate members;

cable directing means disposed between said upper wall and said ski to change the direction of extension of said cable from transverse of said ski to longitudinally of said ski;

actuating means secured to said ski at a point spaced from said ski boot and having a lever member secured to said cable means, said lever member being actuatable in a clamping direction to pull said cable means and clamp said clamping members against said tabs to secure said ski boot on said ski;

and spring means operatively connected to said lever means to permit release of said clamping members when the force of said spring is overcome by excessive force on said clamping members by said ski boot.

77. A safety binding assembly comprising:

a ski;

a ski boot;

a member secured to each side of said ski boot and rearwardly of the point of application of heel lifting force thereon, said members having outwardly directed and apertured tabs;

a clamping member pivotally secured to each side of said ski adjacent said tabs, said clamping members being pivotable along axes transverse of the longitudinal axis of said ski into engagement with said tabs, said clamping members having portions received in said apertures in said tabs when in clamping engagement therewith;

cable means having ends secured to said clamping members and extending longitudinally along said ski;

actuating means secured to said ski at a point spaced from said ski boot and having a lever member secured to said cable means, said lever member being actuable in a clamping direction to pull said cable means and clamp said clamping members into engagement with said tabs to secure said ski boot on said ski;

and spring means operatively connected to said lever means to permit release of said clamping members when the force of said spring is overcome by excessive force on said clamping members by said ski boot.

78. A safety binding assembly comprising:

a ski;

a ski boot;

a member secured to each side of said ski boot and rearwardly of the point of application of heel lifting force thereon, said members having outwardly directed tabs;

a clamping member slidably mounted on each side of said ski adjacent said tabs, said clamping members being slidable transversely of said ski into engagement with said tabs, said clamping members being angularly inwardly directed at the points of engagement with said tabs;

bearing means disposed between said clamping members and said ski to permit easy sliding movement of said clamping members;

a plate member secured to said ski and having an upper wall spaced therefrom, said plate member covering a portion of said clamping members and said bearing means;

cable means having ends secured to said clamping members and extending along said ski beneath said upper surface of said plate member;

actuating means secured to said ski at a point spaced from said boot and having a lever member secured to said cable means, said lever member being actuatable in a clamping direction to pull said cable means and clamp said clamping members against said tabs to secure said ski boot on said ski;

and spring means operatively connected to said lever means to permit release of said clamping members when the force of said spring is overcome by excessive force on said clamping members by said ski boot.

79. A safety binding assembly comprising:

a ski;

a ski boot;

a clamping member pivotally secured to each side of said ski adjacent said ski boot and rearwardly of the point of application of heel lifting force thereon, said clamping members having friction members secured thereon, said clamping members being pivotable into engagement with said ski boot, said clamping members being angularly inwardly directed;

a plate member secured to said ski and having an upper wall spaced therefrom;

cable means having ends secured to said clamping members and extending along said ski beneath said upper surface of said plate member;

actuating means secured to said ski at a point spaced from said ski boot and having a lever member secured to said cable means, said lever member being actuatable in a clamping direction to pull said cable means and clamp said friction members against the sides of said ski boot to secure said ski boot on said ski;

and spring means operatively connected to said lever means to permit release of said clamping members when the force of said spring is overcome by excessive force on said clamping members by said ski boot.

80. A safety binding assembly comprising:

a ski;

a ski boot;

a member secured to each side of said ski boot and rearwardly of the point of application of heel lifting force thereon, said members having outwardly directed tabs;

a clamping member pivotally secured to each side of said ski adjacent said tabs, said clamping members being pivotable along axes parallel to the longitudinal axis of said ski into engagement with said tabs, said clamping members being angularly inwardly directed at the points of engagement with said tabs;

a plate member secured to said ski and having an upper wall spaced therefrom;

cable means having ends secured to said clamping members and extending along said ski beneath said upper surface of said plate member;

cable directing members disposed between said upper wall and said ski to change the direction of said cable means from transverse of said ski to longitudinally of said ski;

actuating means secured to said ski at a point spaced from said ski boot and having a lever member secured to said cable means, said lever member being actuatable in a clamping direction to pull said cable means and clamp said clamping members against said tabs to secure said ski boot on said ski;

and spring means operatively connected to said lever means to permit release of said clamping members when the force of said spring is overcome by excessive force on said clamping members by said ski boot.

*81. In combination: a ski; a ski boot; and safety binding means for releasably resisting longitudinal, lateral, twisting and heel-lifting movement of said ski boot relative to said ski without requiring the use of a toe fastening device, said means including means releasably engaging structure associated with said ski boot forwardly of the rearward end of said ski boot and rearwardly of the point of application of heel lifting force on said ski boot.*

*82. A safety binding adapted to releasably resist longitudinal, lateral, twisting and heel-lifting movement of a ski boot relative to a ski without requiring the use of a toe fastening device, comprising: means adapted to engage structure associated with said ski boot forwardly of the rearward end of said ski boot and rearwardly of the point of application of heel lifting force on said ski boot; and safety release means for releasing said engagement upon the transmission of excessive force by said ski boot.*

*83. In combination: a ski; a ski boot; and safety binding means for releasably securing said ski boot to said ski, said means including actuatable means releasably engaging structure associated with the side portions of said ski boot rearwardly of the point of application of heel lifting force on said ski boot and means for applying a holding force to said actuatable means which is able to be overcome by predetermined relative movement between said ski and said boot.*

*84. A safety binding adapted to releasably secure a ski boot to a ski, comprising: actuatable means adapted to engage structure associated with the side portions of said ski boot rearwardly of the point of application of heel lifting force on said ski boot; and safety release means including means for applying a holding force to said actuatable means which releases said engagement upon the transmission of excessive force by said ski boot.*

*85. A combination according to claim 83 wherein said actuatable means is a moveable clamping member and said means for applying a holding force is a spring means operatively connected to said member.*

*86. A safety binding according to claim 84 wherein said actuatable means is a moveable clamping member and*

*said means for applying a holding force is a spring means operatively connected to said clamping member.*

References Cited

The following references, cited by the Examiner, are of record in the patented file of this patent or the original patent.

UNITED STATES PATENTS

| | | | |
|---|---|---|---|
| 2,276,826 | 3/1942 | Crowther. | |
| 2,858,137 | 10/1958 | Marker. | |
| 382,254 | 5/1888 | Conradson | 280—11.13 |

| | | | |
|---|---|---|---|
| 1,087,745 | 2/1914 | Ellis | 280—11.13 |
| 2,573,955 | 11/1951 | Cubberley | 280—11.35 |
| 2,798,728 | 7/1957 | Gunzl | 280—11.35 |

FOREIGN PATENTS

| | | |
|---|---|---|
| 322,456 | 11/1934 | Italy. |
| 16,743 | 8/1907 | Norway. |
| 295,705 | 3/1954 | Switzerland. |

BENJAMIN HERSH, Primary Examiner

M. L. SMITH, Assistant Examiner